United States Patent
Walsh et al.

(10) Patent No.: US 9,971,501 B2
(45) Date of Patent: May 15, 2018

(54) METHOD AND SYSTEM FOR PROVIDING ADAPTIVE ARRANGEMENT AND REPRESENTATION OF USER INTERFACE ELEMENTS

(71) Applicant: Verizon New Jersey Inc., Newark, NJ (US)

(72) Inventors: Jeffrey M. Walsh, Verona, NJ (US); Woo Beum Lee, Basking Ridge, NJ (US)

(73) Assignee: Verizon New Jersey Inc., Basking Ridge, NJ (US)

( * ) Notice: Subject to any disclaimer, the term of this patent is extended or adjusted under 35 U.S.C. 154(b) by 388 days.

(21) Appl. No.: 14/454,451

(22) Filed: Aug. 7, 2014

(65) Prior Publication Data
US 2016/0041699 A1 Feb. 11, 2016

(51) Int. Cl.
*G06F 3/048* (2013.01)
*G06F 3/0488* (2013.01)

(52) U.S. Cl.
CPC ...... *G06F 3/04886* (2013.01); *G06F 3/04883* (2013.01); *G06F 2203/04802* (2013.01)

(58) Field of Classification Search
CPC .... G06F 3/0482; G06F 3/0481; G06F 3/0484; G06F 3/04847; G06F 3/04842; G06F 3/04815
See application file for complete search history.

(56) References Cited

U.S. PATENT DOCUMENTS

| | | | | |
|---|---|---|---|---|
| 6,317,757 B1* | 11/2001 | Sakamaki | ......... | G06F 17/30899 345/642 |
| 6,597,358 B2* | 7/2003 | Miller | ................. | G06F 3/04815 345/427 |
| 7,134,095 B1* | 11/2006 | Smith | ................. | G06F 3/04812 715/848 |
| 8,866,810 B2* | 10/2014 | Cho | ...................... | G06F 1/1616 345/419 |
| 9,069,455 B2* | 6/2015 | Sripada | ................ | G06F 3/0488 |
| 2010/0169836 A1* | 7/2010 | Stallings | ............. | G06F 3/04817 715/848 |
| 2010/0309228 A1* | 12/2010 | Mattos | ................. | G06F 1/1626 345/654 |
| 2011/0246950 A1* | 10/2011 | Luna | .................. | G06F 3/04815 715/848 |
| 2011/0307834 A1* | 12/2011 | Wu | ...................... | A63F 13/2145 715/836 |

(Continued)

Primary Examiner — Rashawn N Tillery

(57) ABSTRACT

An approach is provided for rendering a representation of a three-dimensional object in a user interface. The approach includes determining an arrangement of one or more user interface elements based on user profile information, content information, contextual information, or a combination thereof. The approach also includes rendering a representation of a three-dimensional object in a user interface, wherein the representation includes one or more surface segments. The approach also includes associating the one or more user interface elements respectively with the one or more surface segments based on the arrangement. The user interaction input manipulates the representation of the three dimensional object within in a virtual three-dimensional space to expose the one or more user interface elements associated with the one or more surface segments that are visible in the user interface.

17 Claims, 12 Drawing Sheets

700a

700b

(56) References Cited

U.S. PATENT DOCUMENTS

| | | | |
|---|---|---|---|
| 2012/0098754 A1* | 4/2012 | Kim | H04N 1/0035 345/173 |
| 2013/0335303 A1* | 12/2013 | Maciocci | G02B 27/017 345/8 |
| 2014/0325455 A1* | 10/2014 | Tobin | G06F 3/04815 715/850 |
| 2015/0019983 A1* | 1/2015 | White | G06F 3/04817 715/739 |
| 2015/0120777 A1* | 4/2015 | Ramos | G06F 3/016 707/776 |
| 2015/0160824 A1* | 6/2015 | White | G06F 3/04815 715/849 |
| 2015/0160832 A1* | 6/2015 | Walkin | G06F 3/044883 715/765 |

* cited by examiner

US 9,971,501 B2

METHOD AND SYSTEM FOR PROVIDING ADAPTIVE ARRANGEMENT AND REPRESENTATION OF USER INTERFACE ELEMENTS

BACKGROUND INFORMATION

As the number of applications and other media content available for user devices (e.g., mobile devices, tablet devices, etc.) and the amount of memory available on these user devices continue to expand, the amount of information that can be accessed from user devices (e.g., mobile devices, tablet devices, etc.) has been increasing. Many users are limited to arranging the graphic user interfaces for these applications and/or media content in a static menu representation. It thus can be increasingly difficult for a user to quickly find and access a specific application in the menu representation. This can often lead to an increasing burden on users to effectively organize and arrange the graphic user interfaces in the menu representation. As a result, service providers face significant technical challenges to enabling users more versatility in the arrangement and representation of the menu. Thus, there is a need for providing a user interface menu capable of more adaptive representation of applications and/or other media content.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing adaptive arrangement and representation of user interface elements are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
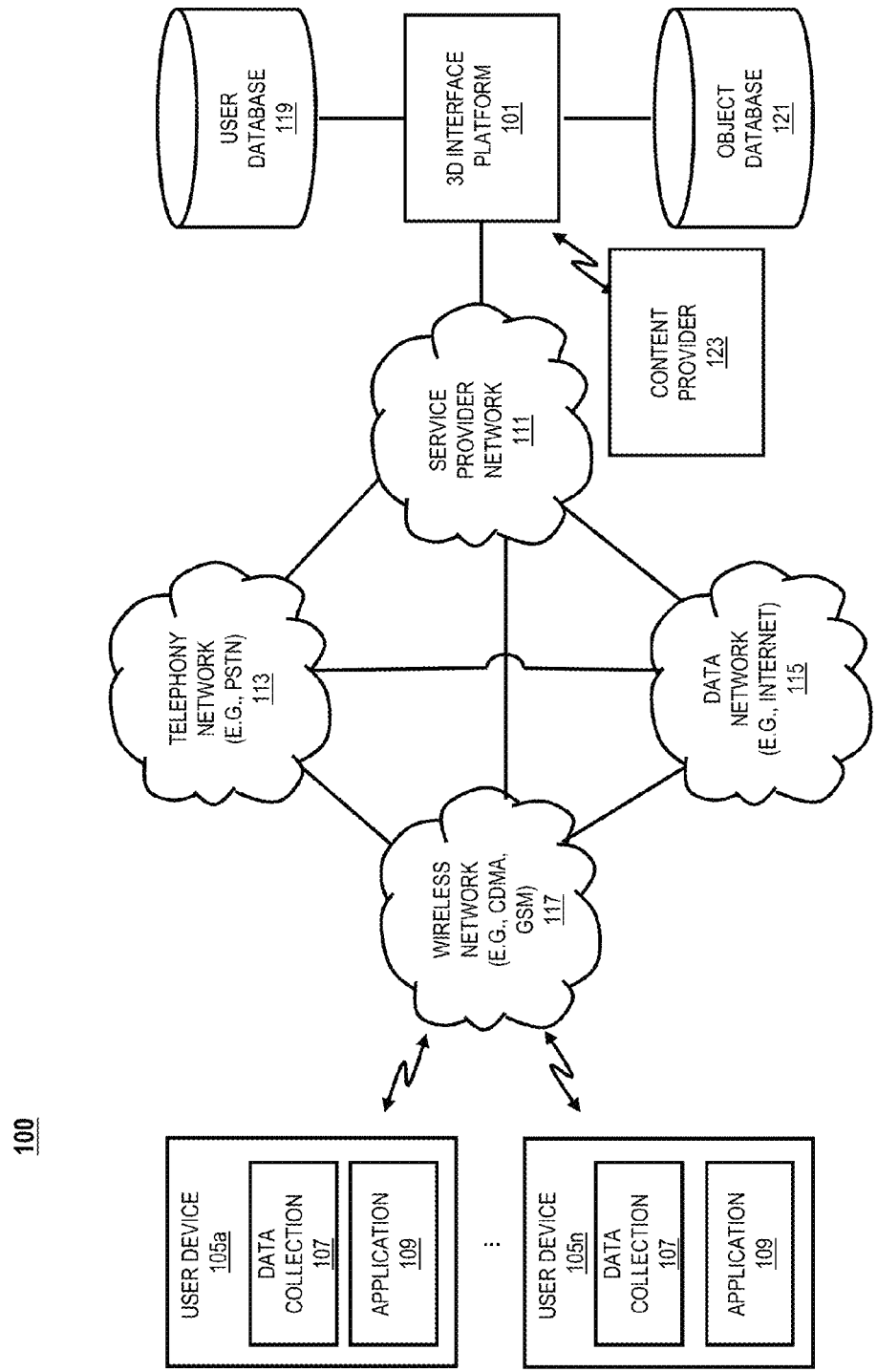
FIG. 1 is a diagram of a system capable of adaptively rendering and representing a three-dimensional (3D) object for one or more user interface elements within a virtual three-dimensional space on a user interface, according to one embodiment.

FIG. 1 is a diagram of a system capable of adaptively rendering and representing a three-dimensional (3D) object for one or more user interface elements within a virtual three-dimensional space on a user interface, according to one embodiment. As noted above, one challenge for a user interface menu is to enable users to more efficiently arrange and navigate user interface elements (e.g., icons, folder icons, etc.). Traditionally, user interface elements are arranged in a menu rendered as two-dimensions in a virtual two-dimensional space. However, the capability and functionality of a two-dimensional (2D) menu can be limiting. The size of the display area of the user device can often limit the number of the user interface elements that can be included in the menu rendered in a single display and require the user to navigate the 2D menu to access certain interface elements (e.g., by swiping left or right). These limitations can potentially constrain the usability, ease of use, and pleasure provided in the interaction with a user device.

To address this problem, a system 100 of FIG. 1 introduces the capability for a 3D interface platform 101 to render a representation of a user interface menu as a (3D) object and manipulation of the representation within 3D space on a user interface of user devices 105a-105n (also collectively referred to as user device 105). In one embodiment, the user device 105 include mobile devices (e.g., any cellular phone, smart phone, wireless, phone), other mobile computing devices, such as laptop computer, notebook computer, netbook computer, tablet, a desktop computer, and/or other computing devices capable of rendering a representation of a 3D object within a virtual three-dimensional space on a user interface.

For instance, the three-dimensional object can include but is not limited to an image of any shape (e.g., cube, triangle, sphere, etc.), branded product (e.g., car, shoe, coffee mug etc.), activity object (e.g., basketball, soccer baseball, etc.), artistic rendition, photograph, among others, or a combination thereof. By way of example, a user interface element can be an icon that represents one or more applications, media content, graphic content, among others, or a combination thereof.

In one embodiment, regions of the three-dimensional object can correspond to one or more surface segments for respective association to one or more user interface elements. The one or more surface segments may correspond to a faceted side(s) of the object, features of the object, among others, or any combination thereof. By way of example, a cube can have at least six surface segments and a soccer ball can have a segment corresponding to each delineated panel. By way of another example, a shoe can have a segment corresponding to different features of the shoe including but not limited to the sole, a lace segment, the tongue, among others, or a combination thereof.

In one embodiment, the 3D interface platform 101 provides the capability of manipulating the representation of the 3D object within the virtual three-dimensional space by user input. In one embodiment, the system 100 enables user interaction input to cause the representation to rotate according to user input to visualize and/or expose the one or more user interface elements. By utilizing three-dimensional space, the interface representation platform 101 can allow the three-dimensional object to be rotated in different directions along three axes (e.g., x, y, and z axes).

In one embodiment, the 3D interface platform 101 enables user interaction input to expose one or more of the user interface elements visible in the user interface, for example, by rendering another representation of the object, rendering a representation of a different object, or a combination thereof. By way of example, a user interaction input selecting a user interface element representing music on the soccer ball can cause a rendering of the 3D soccer ball associated with one or more user interface elements for music within the 3D space. In another example, a user interaction input selecting the user interface element representing music on the soccer ball can cause a rendering of an exploded 2D view of the soccer ball associated with one or more user interface elements for music. User interaction input includes but is not limited to touch interaction (e.g., holding a finger on the user interface over the representation of the object, swiping the representation of the object on the user interface with a finger, expanding or pinching the representation on the user interface with two finger, etc.), gesture interaction (e.g., performing the touch actions in front of the user interface), a voice interaction (e.g., a voice command to a specific user interface element, a voice command to a specific rotation of the object, etc.), a physical manipulation of the device (e.g., moving the device to cause the corresponding rotation), among others, or a combination thereof. In this way, the 3D interface platform 101 provides a more dynamic search capability for a user interface element.

In one embodiment, the system 100 includes an application suite (e.g., 3D interface applications 109a-109n) (collectively referred to as the 3D interface application 109)) that can perform all or a portion of the functions of the 3D interface platform 101. The application suite may include any type of application that can be executed on the user device 105. The application suite includes the 3D interface applications 109 and can also include client programs (e.g., calendar applications, communication applications, Internet browsing applications, music applications (e.g., music streaming applications, music player applications, etc.)), services, or the like that utilize the 3D interface platform 101 or other services, applications, content, etc. available over the communication network. In one embodiment, the 3D interface platform 101 may interface with one or more of the applications 109 on the user device 105 to perform one or more functions described herein.

In one embodiment, the 3D interface platform 101 can retrieve user contextual information, profile information, etc. from a user database 119. In another embodiment, profile information, preferences, etc. as well as contextual information about a user, the user interface 105, or a combination thereof can be collected and monitored at the 3D interface platform 103 or the application 109 on the user interface 105 by a data collection module 107 of the user interface 105. For example, the data collection module 107 may utilize applications, services, sensors, etc. to collect such information. Further, the contextual information can be any one of multiple types of information that can provide conditions (e.g., location, time, activity of the user, ambient light, weather, etc.) that can be used to specify context-based object rendering. Contextual information may include, for instance, location information, camera information, microphone information, environmental sensor information, weather information, user calendar information, accelerometer information, compass information, body temperature information, etc. In one embodiment, the data collection module 107 may have connectivity to a location determination sensor system, such as a Global Positioning System (GPS) to access GPS satellites to determine contextual information (e.g., the location of the user interface 105). The user interface 105 may then cause transmission of the collected information (e.g., the profile information, preferences, contextual information, etc.) to the 3D interface platform 101 for processing to facilitate context-based rendering and representation of an object. In one embodiment, the 3D interface platform 101 can receive and store the information in a user profile associated with the user in the user database 119. In certain embodiments, the user profile may include an identifier of the user (e.g., a username) and/or an identifier of the user device 105 (e.g., a hardware identifier such as an International Mobile Equipment Identity (IMEI), a phone number, an Internet Protocol address, etc.).

In one embodiment, the user database 119 may store object preferences. The user database 119 may store a representation of an object with an arrangement of one or more user interface elements to render, for example, based on contextual information. For example, the user may condition that certain representation of objects and associated interface elements to be rendered during certain activities. By way of example, if the data collection module 107 determines that the user is running, the object indicated for "MUSIC" may be rendered in the user interface.

In one embodiment, an object database 121 may store the object preferences. In one embodiment, the object database 121, may store an arrangement of one or more user interface elements, the representation of the three-dimensional object, the one or more user interface elements, etc. In one embodiment, the object database may store one or more object attributes (e.g., color, font, etc.), feedback, and other features associated with the arrangement, representation, the one or more user interface elements, among others, or a combination thereof. In one embodiment, the object database 121 may store one or more templates for these items, a preconfigured set of one or more user interface elements, representation of objects, an arrangement of one or more interface elements, or a combination thereof, available for download by the user. In one embodiment, content providers 123 (e.g., vendors, advertisers, etc.) may determine the template(s) and/or preconfigured set stored in the object database 121 available for the user to download. By way of example, a shoe company may make a representation of one of their popular shoes and/or related sports objects available for download by a user. In this way, vendors, advertisers, etc. can create user interfaces for sharing and downloading by end users to customize their devices like themes.

In one embodiment, the 3D interface platform 101 provides the capability of the representation of a three-dimensional object, the arrangement of one or more user interface elements, and the one or more-user interface elements being linked to a reward system and/or payment system. For instance, a user may gain access to certain object(s), user interface element(s), among others, or attributes thereof may be available to a user after the redemption and/or accumulation of a certain number of reward points provided by a company (e.g., vendor, advertisers, etc.) and/or payment. By way of example, after reaching a certain reward amount, certain objects, one or more user interface elements and/or object attributes stored in the object database 121 may be unlocked and available for use or download by the user. For example, a user may not have access to the full capability of an object until a certain number of points are reached.

In one embodiment, the 3D interface platform 101 determines an arrangement of the one or more user interface elements based on user profile information, content information, contextual information, or a combination thereof. In one embodiment, the arrangement may include determining the one or more user interface elements to include in the arrangement. By way of example, the arrangement may be based on the content information and/or number of user interface elements. For example, the one or more user interface elements may be grouped into one or more categories based on the content of the application, media, etc. associated with the one or more user interface elements. These categories may have the one or more user interface elements associated with the one or more segments. For example, the categories may include but are not limited to entertainment, social, sports, financial, news, music, etc. The categories can also be selected by and determined by the user (e.g., user profile information stored in the user database 119). In yet another embodiment, the arrangement of the one or more user interface elements may be based on contextual information. By way of example, if the data collection module 107 determines that the user is running, the interface elements associated with music may be arranged on the representation of the object so that they are visible in the interface display. In another example, if the data collection module 107 determines that the user is at a car dealership, a content provider 123 may make an arrangement of interface elements providing content associated with the car available, a representation of a three-dimensional car, etc. for download. Therefore, the 3D interface platform 101 may determine the arrangement of the one or more user interface elements based on user profile information, content information, contextual information, or a combination thereof.

In one embodiment, the 3D interface platform 101 can select the arrangement, the representation of the three-dimensional object, the one or more interface elements, or a combination thereof from a template, a preconfigured set, or a combination thereof. By way of example, as mentioned above, the user may select the representation of the object and associated arrangement of one or more user interface elements from a template and/or preconfigured set of templates and that selection may be conditioned on certain activities (e.g., running) By way of another example, the 3D interface platform 101 may determine the representation of a 3D object based on the size and number of user interface elements associated with the content information. In this way, the 3D interface platform 101 allows for adaptive and dynamic rendering of a representation of a 3D object that improves ease and pleasure of interaction.

By way of another example, a content provider may select the representation of an object, one or more user interface elements, the arrangement of the one or more user interface elements, or a combination thereof, as well as templates and/or preconfigured set, or a combination thereof, available for download based on certain contextual information. For example, if it is determined that a user is at a concert venue based on, for example, GPS location information, the content provider 123 (e.g., the concert organizer) may make a representation of a 3D object with segments associated with one or more interface elements representing a link to music purchases, a map of the venue, band information, etc. available for download. In yet another example, a representation of 3D object for a product with segments associated with one or more interface elements representing a link to relevant content may be rendered. For example, a representation of a shoe for a company may be rendered that includes interface elements for information about the product and/or sponsored event provided in segments of the shoe. In this way, the 3D interface platform 101 provides the capability of content providers to create dynamic user interfaces to provide related content for share and download by users.

In one embodiment, the system 100 may present the feedback to the user based on the user interaction input. The feedback may be stored in the user database 119 and/or object database 121. The feedback may include but is not limited to audio feedback, tactile feedback, among others or a combination thereof. By way of example, if the user swipes the user interface to cause a soccer ball object to move, soccer related audio (e.g., "GOAL . . . L") may be presented during the rotation. By way of another example, if the user selects a segment associated with a feature of a car, audio of the car engine may be presented.

In one embodiment, the system 100 may support different configurations of the application 109 depending on whether the embodiments of the features described herein are implemented as device-based features or network-based features. For example, if a service provider supports the application 109 in device-based embodiment, the application 109 may be native to the device 105. In one embodiment, the application 109 may be downloadable to the device 105 and/or additional device, for example, from the content providers 123.

In one embodiment, the content providers 123 (businesses offering the services of the 3D interface platform 101 as at least part of their service offerings) may implement the 3D interface platform 101 on a mobile device client, network host, cloud-based host, web-based client, or combination thereof. The implementation chosen may determine the varying levels of the system 100's functionality. According to one embodiment, in a user device-based implementation, where the 3D interface platform 101 may be supported by a wireless carrier, the content providers 123 may install the 3D interface platform 101 native to the device. According to another embodiment, where the user device-based implementation is wireless carrier agnostic, the 3D interface platform 101 may be downloaded as a separate application.

In exemplary embodiments, any number of customers may access the 3D interface platform 101 through any mixture of tiered public and/or private communication networks. According to certain embodiments, these public and/or private communication networks can include, for example, networks 113-117. For illustrative purposes, the networks 113-117 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-117 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that networks 111-117 may include components and facilities to provide for signaling and/or bearer communications between the various components or facilities of system 100. In this manner, networks 111-117 may embody or include portions of an SS7 network, or other suitable infrastructure to support control and signaling functions.

Figure 2:
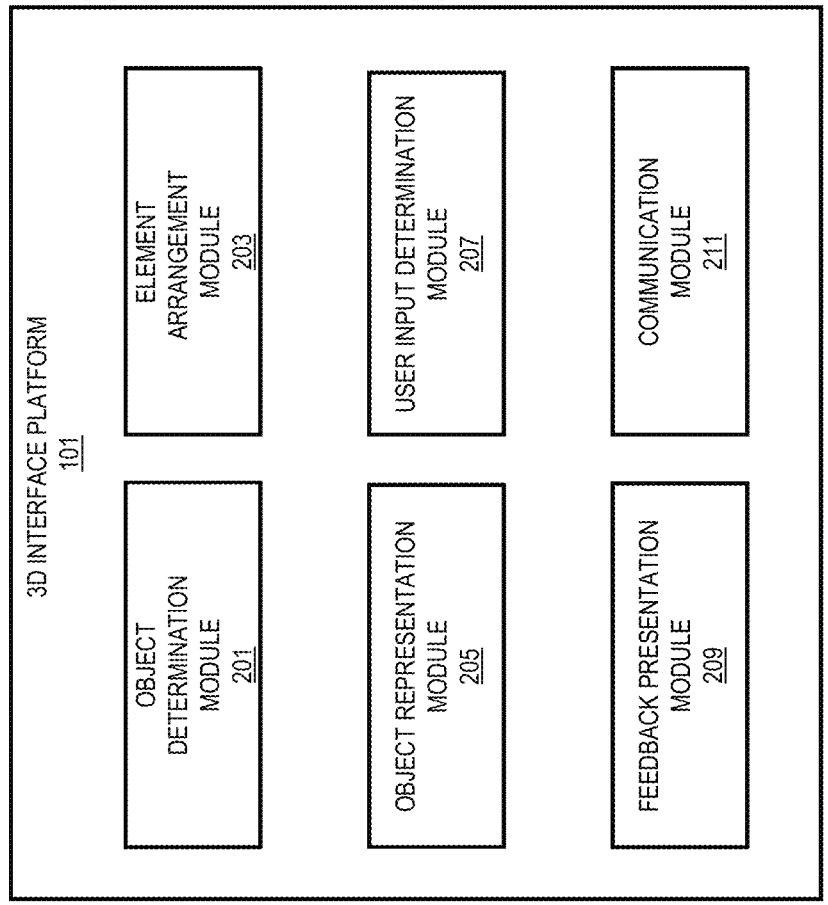
FIG. 2 is a diagram of a 3D interface platform capable of adaptively rendering and representing a three-dimensional (3D) object for one or more user interface elements within a virtual three-dimensional space on a user interface, according to one embodiment.

FIG. 2 is a diagram depicting the components of the 3D interface platform 101, according to one embodiment. The 3D interface platform 101 includes various executable modules for performing one or more computing, data processing and network based instructions that in combination provide a means for adaptively rendering a representation of a three-dimensional object within a virtual three-dimensional space. Such modules can be implemented in hardware, firmware, software or a combination thereof. Although the 3D interface platform 101 is depicted as a standalone component, it is contemplated that the 3D interface platform 101 and/or its functions may be implemented in other components of the system 100 including the user devices 105 and the service provider network 111.

By way of example, the 3D interface platform 101 may include an object determination module 201, an element arrangement module 203, an object representation module 205, a user input detection module 207, a feedback presentation 209, and a communication module 211. These modules 201-211 can interact with the user database 119 and/or object database 121 in support of their functions. According to some embodiments, the user database 119 and/or the object database 121 are maintained and updated based, at least in part, on one or more operations (e.g., communications operations) or transactions conducted on the user devices 105.

In one embodiment, the object determination module 201 determines a representation of an object and/or object attributes to render on a user interface based on user selection, content provider, content information, contextual information, or a combination thereof. According to some embodiments, the object selection module 201 also determines a rendering of a representation of a 3D object to present on the user interface when user interaction input manipulates the representation by the user interaction input. For example, the object selection module 201 can cause another representation of the 3D object, another 3D object, or a combination thereof to be displayed based on the user interaction.

In one embodiment, the object determination module 201 may determine the representation of the 3D object, one or more user interface elements, or a combination thereof based on the user preferences stored in the user database 119. By way of example, the user may indicate that a representation of a 3D ball for display and an exploded representation of the ball when a user interface element is selected be rendered. According to some embodiments, the user may indicate that certain 3D objects be rendered based on contextual information. For example, the user may want a specific representation of a 3D object to be rendered for a certain activity (e.g., running).

In some embodiments, the object determination module 201 may determine the representation of the 3D object to render based on the content provider 123. In some embodiments, the content provider can control the selection of the object by the user by providing one or more templates and/or preconfigured set of templates available to the user in the database. For example, a content provider 123 can provide access to one or more objects to the user for free and require the user to pay or earn rewards to gain access to additional objects and/or object attributes.

In yet another embodiment, the object determination module 201 may determine the representation of the 3D object to render based on the content information. By way of example, the representation of the 3D object may be based on the number of surface segments required for the number and size of the user interface elements associated with the content information. By way of example, if at least six segments are needed, a representation of a 3D object with at least six segments would be rendered. In this case, a representation of a pyramid with only four segments would not be rendered.

In one embodiment, the element arrangement module 203 can determine an arrangement of the one or more user interface elements based on user profile information, content information, contextual information, or a combination thereof. In one embodiment, the element arrangement module 203 may determine the one or more user interface elements to arrange based on user profile information, content information, contextual information, or a combination thereof. The available arrangements and/or one or more user interface elements may be based on a template selected by a user. By way of example, the one or more user interface elements can be arranged in categories based on the content represented by the element and/or user preferences based on the arrangement. For example, the one or more user interface elements for music may be arranged together.

In one embodiment, the element arrangement module 203 can also associate the one or more user interface elements respectively with the one or more surface segments based on the arrangement. By way of an example, the one or more user interface elements for music can be associated with one surface of a representation of a cube labeled "MUSIC.". In one embodiment, the object representation module 205 can render the representation of the 3D object in the user interface based on the object determination module 201, the element arrangement module 203, and the user input detection module 207. In some embodiments, the object representation module 205 can render a representation of a 3D object in the user interface when user interaction input manipulates the representation by the user interaction input. For example, the object selection module 201 can cause another representation of the 3D object, another 3D object, or a combination thereof to be rendered in the user interface based on the user interaction determined by the user input detection module 207.

In one embodiment, the user input detection module 207 can detect a user input interaction to manipulate the representation of the object. User interaction input includes but is not limited to touch interaction (e.g., holding a finger on the user interface over the representation of the object; swiping the representation of the object on the user interface with a finger, expanding or pinching the representation on the user interface with two finger, etc.), gesture interaction (e.g., performing the touch interactions in front of the user interface), a voice interaction (e.g., a voice command to a specific user interface element, a voice command to a specific rotation of the object, etc.), a physical manipulation of the device (e.g., moving the device to cause the corresponding rotation), among others, or a combination thereof. By way of example, a user can cause rotation of the representation of the object in a direction by swiping a finger on the user interface over a user interface element provided in representation of the 3D object in that direction. By way of another example, a user can cause rotation of the representation of the 3D object in a direction by physically tilting the device in that direction or an oral command.

In one embodiment, the feedback presentation module 209 can present feedback associated with the manipulation of the representation of the object. The feedback can include audio feedback, tactile feedback, among others or a combination thereof. By way of example, if the user swipes the user interface to cause a basketball shoe to move, basketball related audio (e.g., "swoosh") may be presented during the rotation. By way of another example, if the user selects a segment associated with on a car, tactile feedback may be presented similar to revving of an engine.

In one embodiment, the communication module 211 executes various protocols and data sharing techniques for enabling collaborative execution between the 3D interface platform 101, the user devices 105, the application 109, the networks 111-117, and other components of the system 100. In addition, the communication module 211 enables generation of signals for communicating with various elements of the service provider network 111, including various gateways, policy configuration functions and the like.

Figure 3:
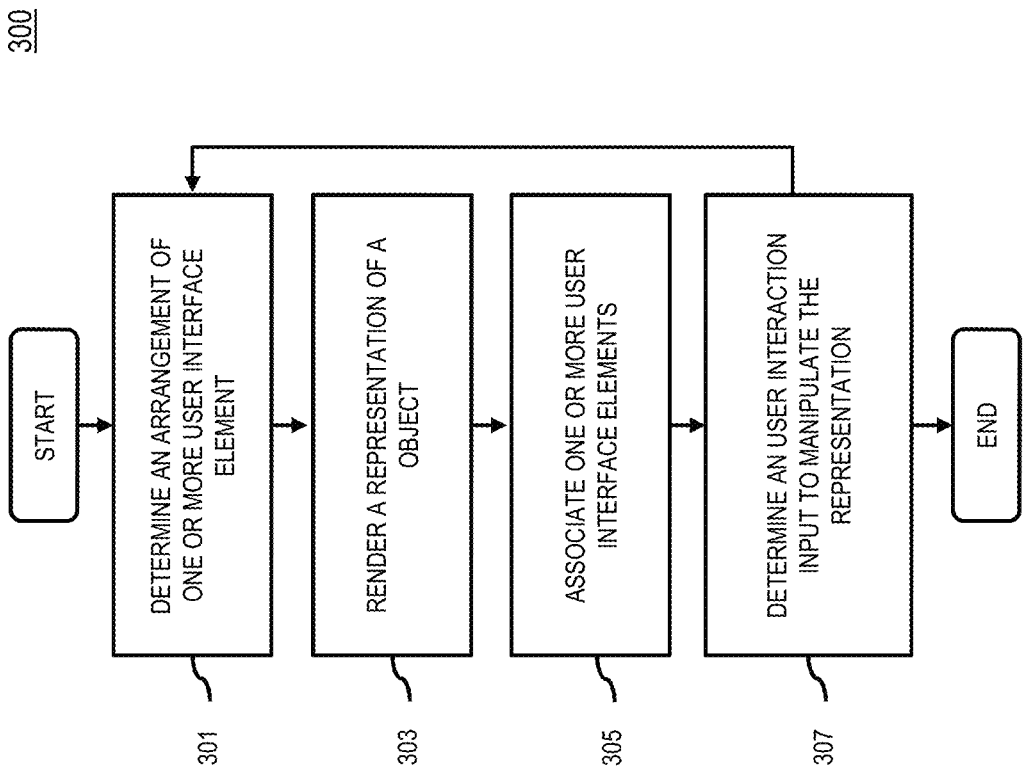
FIG. 3 is a flowchart of a process of rendering a representation of a three-dimensional object in a virtual three-dimensional space, according to one embodiment.
Figure 12:
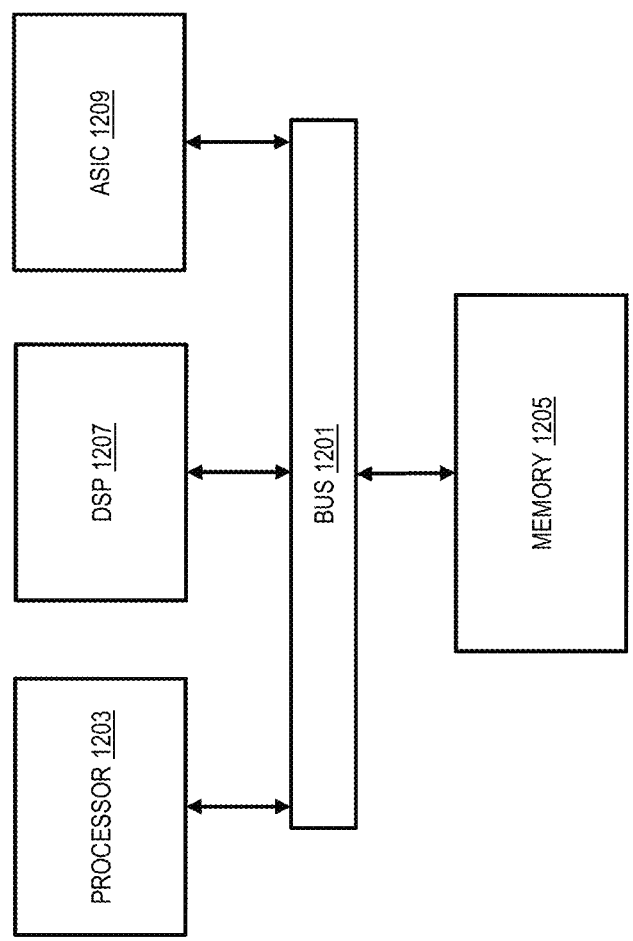
FIG. 12 is a diagram of a chip set that can be used to implement various exemplary embodiments.

FIG. 3 is a flowchart of executing various 3D interface platform features, according to one embodiment. In one embodiment, the 3D interface platform 101 performs the process 300 and is implemented in, for instance, a chip set including a processor and a memory as shown in FIG. 12. In addition or alternatively, the 3D interface application 109 may perform all or a portion of the process 300. Although FIG. 3 illustrates steps 301 through 305 in a particular order, the order and number of steps is merely for explanation, and one or more steps may be performed in a different order or removed.

In step 301, the 3D interface platform 101 determines an arrangement of the one or more user interface elements to be associated with the representation of the object. In one embodiment, the 3D interface platform 101 determines the arrangement based on user profile information, content information, contextual information, or a combination thereof. By way of example, the arrangement of the one or more user interface elements may refer to the group of the one or more interface elements into one or more categories, the location of the one or more user interface element on the representation, the one or more user interface elements, among others, or a combination thereof. In one embodiment, the 3D interface platform 101 determines the arrangement and the one or more user interface elements from a template, a preconfigured set, or a combination thereof. By way of example, the content providers 123 may provide a template with a predefined arrangement of one or more user interface elements available for download. In a further example, the content providers 123 may provide the template based on user location, user activity, among others. By way of another example, the user database 119 may store the template for the arrangement with an associated activity (e.g., running).

In step 303, the 3D interface platform 101 renders a representation of a 3D object in the 3D virtual space on the user interface of the user device 105. In one embodiment, the 3D interface platform 101 determines the representation, the one or more surface segments, or a combination thereof. By way of example, the representation of the 3D may be rendered as an initial menu for the one or more user interface elements. In one embodiment, the 3D interface platform 101 may render a representation of the 3D object based on the user interaction input to manipulate the representation of the 3D object within the virtual space. For example, the 3D interface platform 101 may render an another representation of the 3D object, another 3D object, an exploded view representation, or a combination thereof based on user interaction input that indicates a selection of one or the one or more user interface elements. In this case, the other representation of the 3D object, other 3D object, an exploded view representation, or a combination thereof may be rendered as a sub-menu that includes the one or more user interface elements associated with the selection.

In one embodiment, the representation to be rendered may be determined based a template, preconfigured set, or combination thereof provided in the user database 119 or available for download in the object database 121, for example, by the content providers 123. By way of example, the user may set a representation of a default 3D object in the user profile to render by the 3D interface platform 101. In this example, the user may also set a representation of 3D objects to be rendered according to contextual information. For example, the user may select a representation of 3D object with workout applications and music applications associated with the one or more surface segments when at the gym. In one embodiment, the 3D interface platform 101 may determine the representation of the 3D object to render based on the number of user interface elements to associate with the representation. In another example, the content providers 123 may select a rendering of the representation of a 3D object based on location available for download. For example, the content providers 123 may render a representation of a 3D object with available services when located in retail store. In one embodiment, the representation of the 3D object and corresponding object attributes may be limited by the content providers 123 and may be tied to a payment and/or reward system.

In step 305, the 3D interface platform 101 associates the one or more user interface elements with one or more surface segments of the representation based on the arrangement. By way of example, the arrangement of the one or more user interface elements may be associated with the segments of the representation so that certain interface elements are visible in the interface.

In step 307, the 3D interface platform 101 determines a user interaction input to manipulate the representation of the 3D object within the 3D space to expose the one or more user interface elements. The 3D interface platform 101 may process the user interaction input to determine the manipulation of the representation. By way of example, the 3D interface platform 101 may process the user interaction input to determine whether the manipulation corresponds to a selection of one or more user interface elements or a rotation of 3D object in the three dimensional space.

Figure 4:
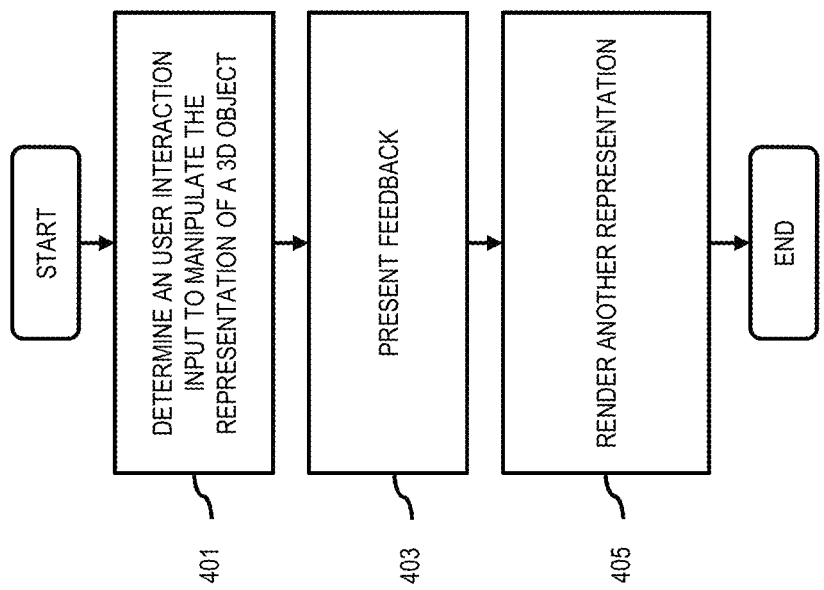
FIG. 4 is a flowchart of a process of rendering a representation of a three-dimensional object in a virtual three-dimensional space based on user interaction input to manipulate a representation in the user interface, according to one embodiment.

FIG. 4 is a flowchart of rendering a representation of an object based on a manipulation, according to one embodiment. In one embodiment, the 3D interface platform 101 performs the process 400 and is implemented in, for instance, a chip set including a processor and a memory as shown in FIG. 12. In addition or alternatively, the 3D interface application 109 may perform all or a portion of the process 400. Although FIG. 4 illustrates steps 401 through 405 in a particular order, the order and number of steps is merely for explanation, and one or more steps may be performed in a different order or removed.

In step 401, the 3D interface platform 101 determines a user interaction input to manipulate the representation of a 3D object rendered in the 3D virtual space on the user interface of the user device 105. In one embodiment, the 3D interface platform 101 determines the user interaction input based on information collected by the data collection module 107. The user interaction can include touch interaction, gesture interaction, a voice interaction, sensor information indicating a physical manipulation of the user device 105, or a combination thereof. In one example, the 3D interface platform 101 may determine that the user interaction relates to a moving the representation within the virtual three-dimensional space. In another example, the 3D interface platform 101 may determine that the user interaction relates to a selection of one or more user interface elements associated with a segment of the representation.

In step 403, the 3D interface platform 101 can present feedback to the user according to the manipulation. In one embodiment, the 3D interface platform 101 may determine the feedback to present based on the user database 119 and/or object database 121. The feedback may include audio feedback, tactile feedback, or a combination thereof. In yet another example, the 3D interface platform 101 may not present feedback if the feedback is not selected by the user and/or service provider, not "unlocked" by the user, among others, or a combination thereof. In one example, the feedback may be associated with the representation of the three-dimensional object. In one example, if the representation is a representation of as soccer ball, the feedback associated with the manipulation of the soccer ball to cause it to "roll" may be different from the feedback associated with the manipulation of the soccer ball to select one or more user interface elements associated with a segment visible in the user interface.

In step 405, the 3D interface platform 101 determines another representation of the object, a different object, or a combination thereof to render in the user interface based on the manipulation. The 3D interface platform 101 may process the user interaction input to determine the manipulation of the representation. By way of example, the 3D interface platform 101 may process the user interaction input to determine whether the manipulation corresponds to a selection of one or more user interface elements or a rotation of 3D object in the three dimensional space. In one embodiment, the user interaction input to manipulate the representation may be associated with different representations. By way of example, a selection of a segment on the representation by holding the segment with a finger may result in a representation of the one or more user interface elements associated with the selection in another 3D representation of the object. In yet another example, a selection of a segment on the representation by holding the segment with a finger and "expanding" with another finger may result in a representation of the one or more user interface elements associated with the selection in an exploded representation of the object.

Figure 5:
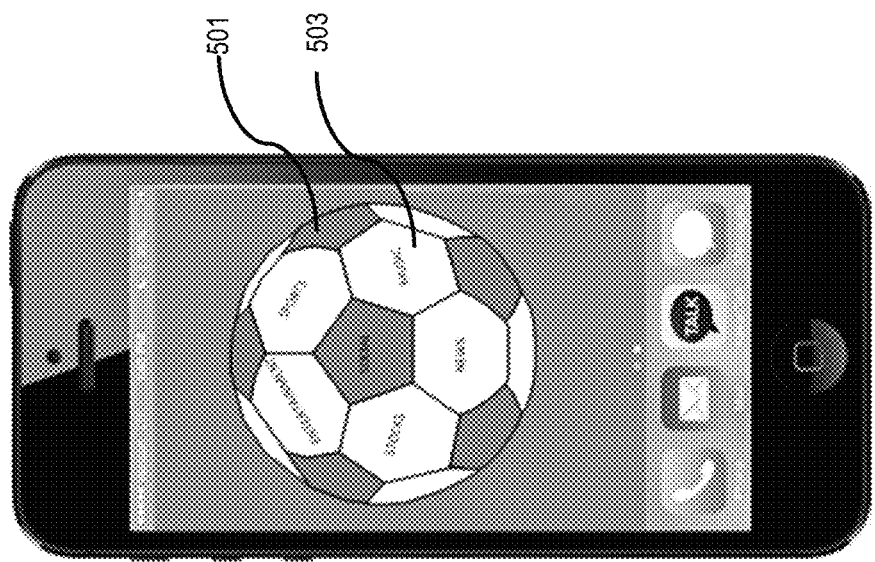
FIG. 5 is a diagram of a user interface utilized in the processes of FIGS. 3 and 4, according to one embodiment.

FIGS. 5-10 are diagrams of user interfaces utilized in the processes of FIGS. 3 and 4, according to one embodiment. FIG. 5 illustrates a user interface 500 with a rendered representation of a three-dimensional object 501 by the 3D interface platform 101. In this case, the representation of the three-dimensional object 501 is a soccer ball that includes a plurality of surface segments corresponding to the panels 503. The interface elements associated with the surface segments include entertainment, sports, social, stocks, news, and music. In this example, the interface elements correspond to interface element categories. By way of example, the user may have selected the representation of the soccer ball from a template, preconfigured set of templates, or a combination thereof available in the object database 121. In another example, a content provider made the soccer ball available for download from the object database 121, for example, to promote a major soccer match. In this way, the user can customize their device in "soccer" theme.

Figure 6:
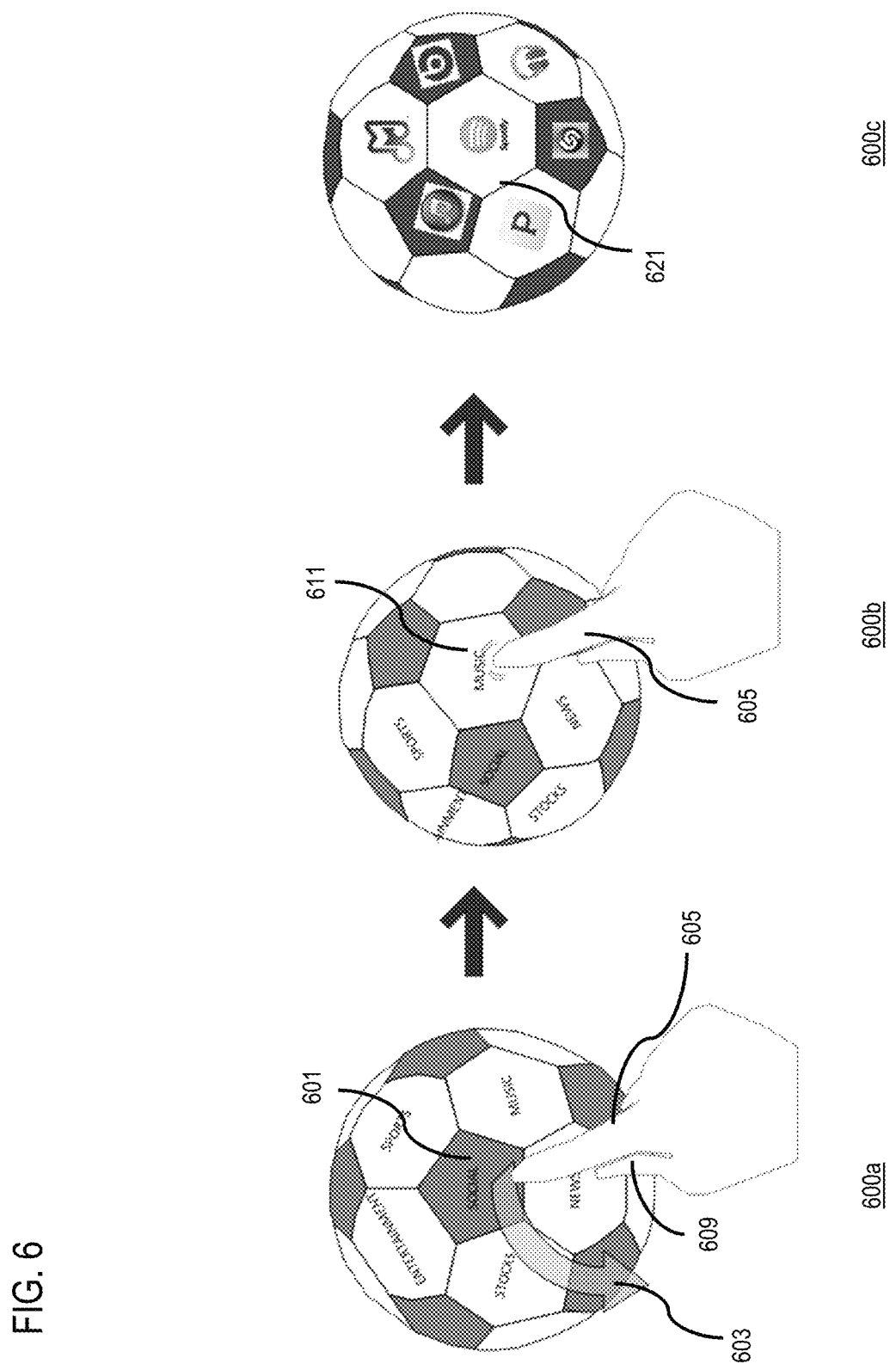
FIG. 6 is a diagram of a user interface utilized in the processes of FIGS. 3 and 4, according to one embodiment.
Figure 7:
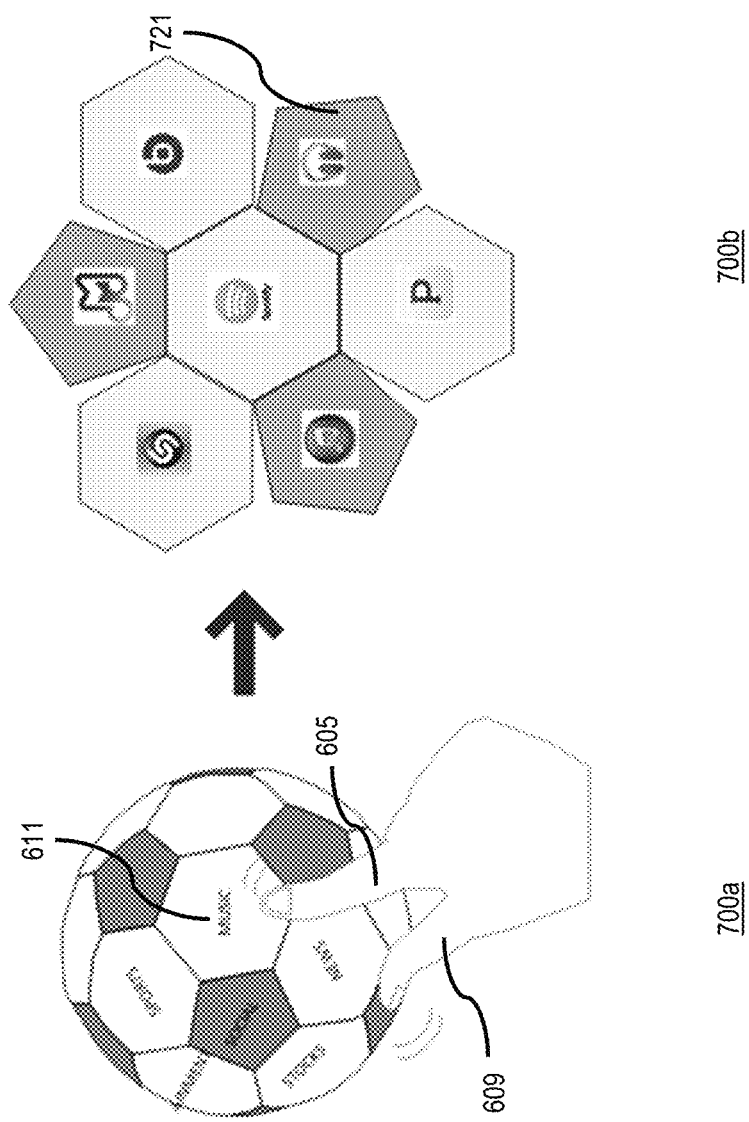
FIG. 7 is a diagram of a user interface utilized in the processes of FIGS. 3 and 4, according to one embodiment.
Figure 8:
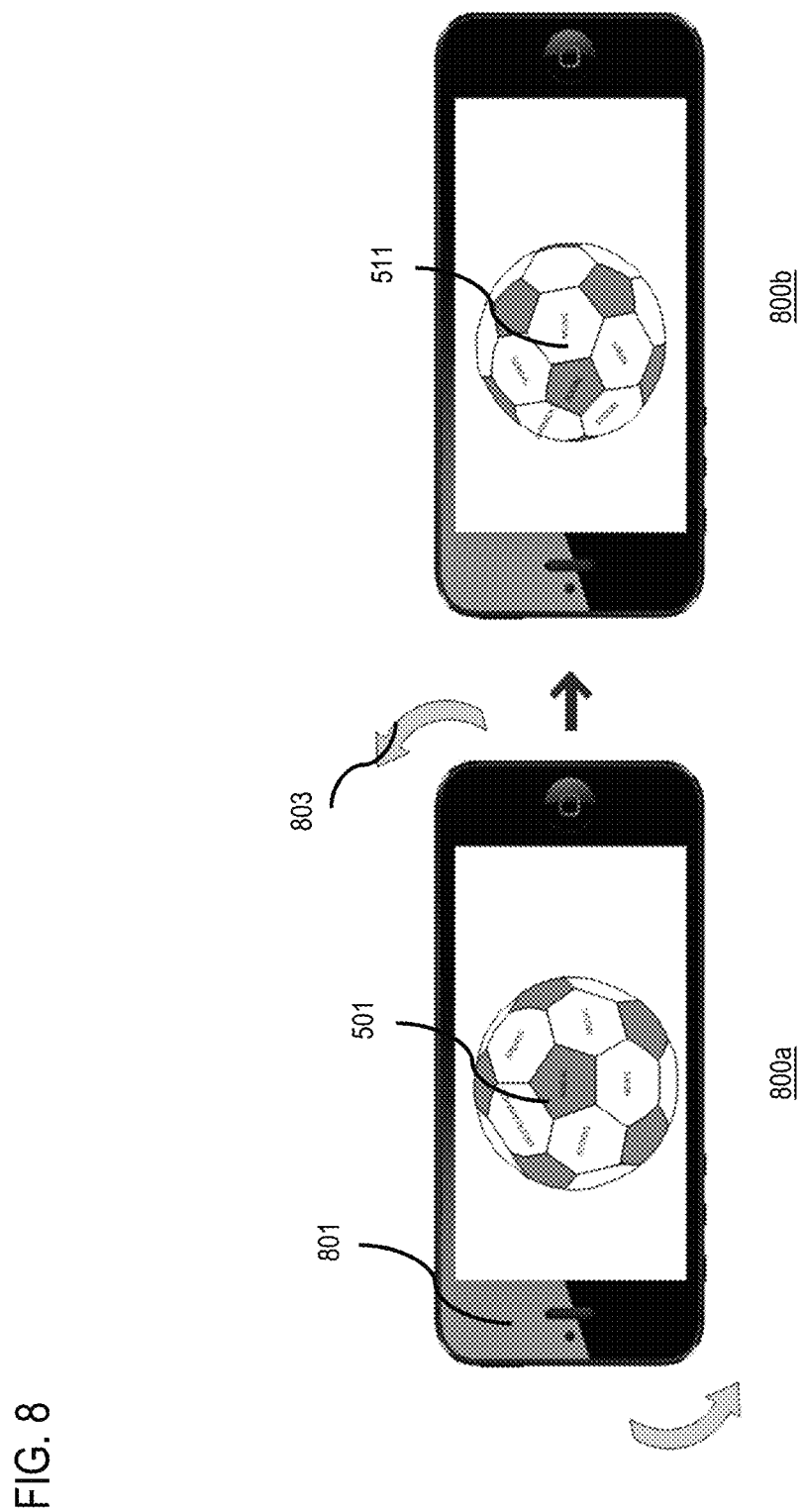
FIG. 8 is a diagram of a user interface utilized in the processes of FIGS. 3 and 4, according to one embodiment.

FIGS. 6-8 show diagrams of manipulation of the representation of the three-dimensional object 501 on interface 500 by user interaction input. FIG. 6 shows selection of a user interface element via user interfaces 600a-600c, according to one embodiment. As shown, user interface 600a shows rotation of the representation of the soccer ball 501 by touch interaction. In this example, the user swipes from the segment 601 associated with "SOCIAL" interface element in a downward direction 603 with a finger. In this example, the user's index finger 605 was used. As shown in user interface 600b, the touch interaction causes the representation of the soccer ball to rotate or "roll" to improve the visibility of the segment associated with the "MUSIC" interface element 611 in the user interface. In this way, the user can experience a "feeling" of a third dimension when navigating through the application menu interface. In user interface 600b, the user selects the "MUSIC" interface element 611 by holding a finger 605 on the interface over the representation of element 611. As shown in user interface 600c, the selection of the "MUSIC" interface element 611 can cause a rendering of the representation of the three-dimensional soccer ball with interface elements 621 representing different music applications associated with the segments.

FIG. 7 shows selection of a user interface element via user interfaces 700a and 700b, according to another embodiment. Like user interface 600a of FIG. 6, the representation of the soccer ball 501 has been rotated to better view the segment associated with the "MUSIC" interface element 611 in user interface 700a. In this example, the user selects the "MUSIC" interface element 611 by holding the element 611 with the index finger 605 and "expands" the representation with thumb 609. As shown in user interface 700b, the selection of the "MUSIC" interface element 611 can cause a rendering of a exploded representation of the soccer ball with interface elements 721 representing different music applications associated with the segments.

In this way, the representation 501 acts as a menu for navigation and the representations in user interface 600c of FIG. 6 and user interface 700b of FIG. 7 act as a sub-menu for navigation. The 3D interface platform 101 may determine which representation to render when an interface element is selected (e.g., user interface 600c or user interface 700b) based on user selection, service provider selection, content information, contextual information, or a combination thereof. In one example, the representation may be selected from a template, preconfigured set, or a combination thereof provided in the user database 119 and/or available for download from the object database, for example, by the content provider. In another example, the 3D interface platform 101 may determine to render the three-dimensional representation shown in user interface 600c if the number of user interface elements associated with the selected interface element exceeds the number of segments included in the exploded representation.

FIG. 8 shows rotation of the representation of the soccer ball 501 based on a different user input interaction via user interfaces 800a and 800b. In this example, the user physically manipulates the user device to cause the representation of the soccer ball 501 to rotate or "roll" instead of swiping with a finger as shown in user interface 600a of FIG. 6. As shown in user interface 800a, the user device 801 is physically rotated in the counter-clockwise direction 803 until the representation of the soccer ball 501 is rendered within the interface in user interface 800b. As shown in user interface 800b, the visibility of the segment associated with the "MUSIC" interface element 611 is improved in the user interface.

Figure 9:
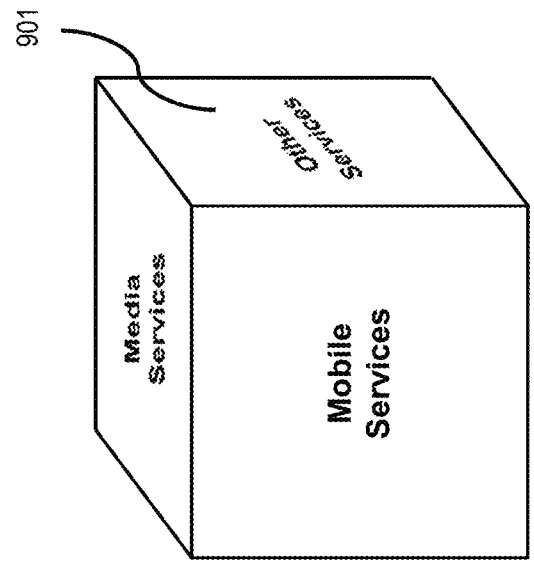
FIG. 9 is a diagram of a user interface utilized in the processes of FIGS. 3, and 4 according to one embodiment.
Figure 10:
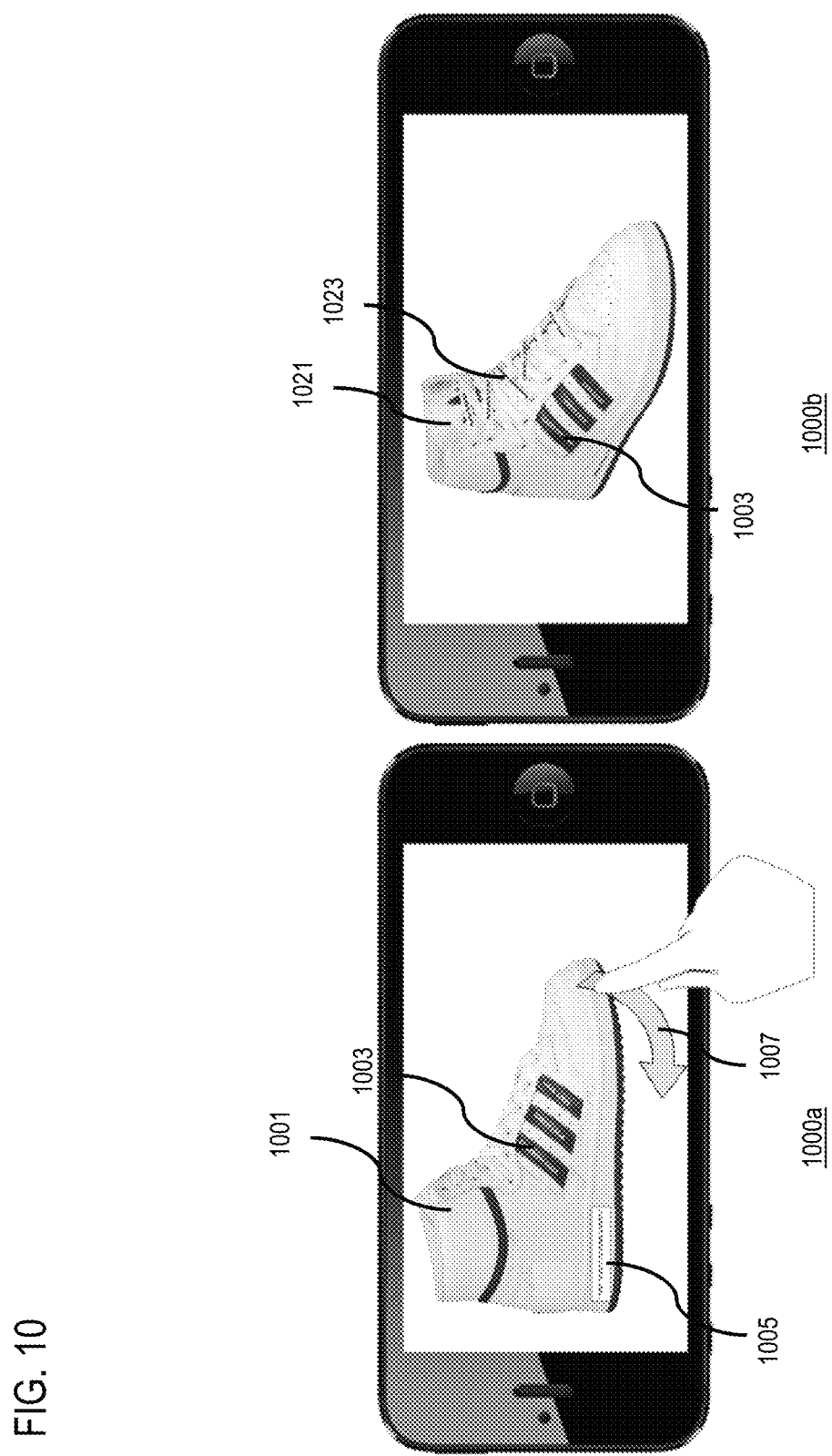
FIG. 10 is a diagram of a user interface utilized in the processes of FIGS. 3 and 4, according to one embodiment.

FIGS. 9 and 10 show representations of three-dimensional objects available for download by a content provider. For example, these representations may be available for download by the content provider. In another example, the availability of these representations for download may be based on payment and/or reward points.

FIG. 9 shows a representation of a cube 900 with interface elements representing different services associated with the segments (e.g., surfaces of the cube). By way of example, a content provider may provide the cube interface as an available download, for example, when entering a retail store associated with the content provider's services.

FIG. 10 shows a representation of a three-dimensional shoe in a 3D shape in the interface via user interfaces 1000a and 1000b. In this example, the representation of the shoe includes content associated with a specific basketball game and other media content. By way of example, a content provider may provide the shoe interface as an available download, for example, as a promotion of a basketball game. As shown in FIG. 10, the representation of the representation of shoe 1001 includes segments corresponding to features of the shoes. As shown in user interface 1000a, the representation 1001 includes one or more user interface elements in the stripes 1003, lace segments 1023, and the sole 1005. The user interface elements associated with the lace segments 1023 are not visible in the user interface 1000a. To view the lace segments, the user swipes in a clockwise direction 1007 to cause the representation to rotate in the three-dimensional space. As shown in user interface 1000b, the representation of the shoe is rotated so that additional features of the shoe are visible in user the interface. In the representation of the three-dimensional space in user interface 1000b, the representation includes the tongue 1021 and the lace segments 1023. In this way, the 3D interface platform 101 can be utilized by a content provider to provide user interfaces that can be used as adaptive advertisements. These user interfaces can provide a free menu that includes the company branded logos for download with custom graphics, free music, etc. In this way, the user interface can act as a "theme" user interface template for the user to download to customize their devices.

Figure 11:
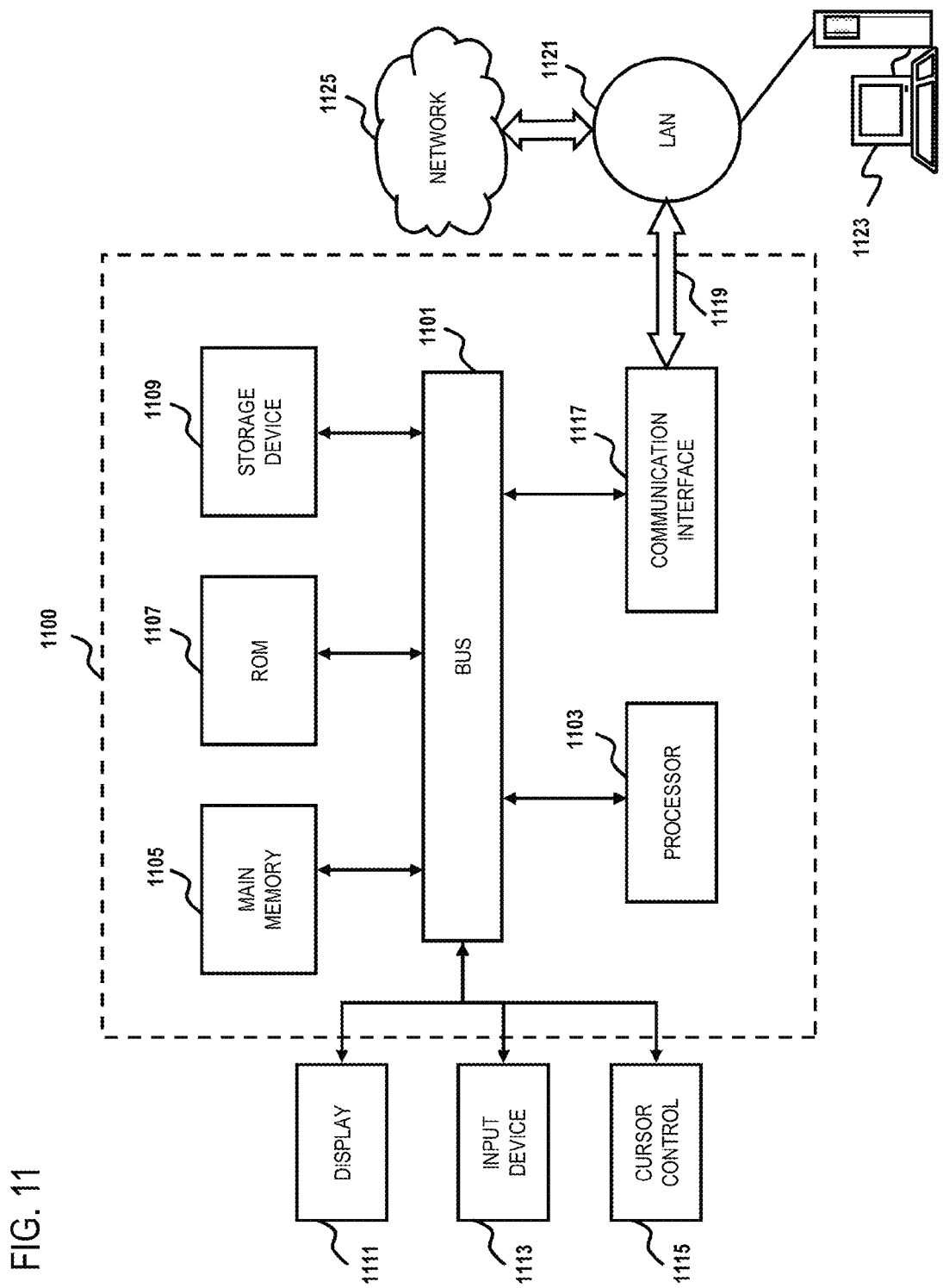
FIG. 11 is a diagram of a computer system that can be used to implement various exemplary embodiments.

FIG. 11 illustrates computing hardware (e.g., computer system) upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as random access memory (RAM) or other dynamic storage device, coupled to the bus 1101 for storing information and instructions to be executed by the processor 1103. Main memory 1105 also can be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 12 illustrates a chip set 1200 upon which an embodiment of the invention may be implemented. Chip set 1200 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. 3 and 4.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1205 also stores the data associated with or generated by the execution of the inventive steps.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
   determining an arrangement of one or more user interface elements based on user profile information, content information, contextual information, or a combination thereof;

rendering a representation of a first three-dimensional object in a user interface of a user device,
  wherein the representation includes one or more surface segments,
  wherein the first three-dimensional object is a particular three-dimensional shape;
associating the one or more user interface elements respectively with the one or more surface segments based on the arrangement;
determining that the user device has been rotated;
manipulating, based on the rotation of the user device, the representation of the first three-dimensional object within a virtual three-dimensional space to expose the one or more user interface elements associated with the one or more surface segments that are visible in the user interface, wherein a direction of the manipulation is based on a direction of the rotation of the user device;
receiving a first user interaction input that indicates a selection of the user interface element;
rendering, based on the first user interaction input, a representation of a second three-dimensional object to present one or more additional user interface elements, that are associated with the selected user interface element,
  wherein the second three-dimensional object is a same three-dimensional shape as the particular three-dimensional shape of the first three-dimensional object;
receiving a second user interaction input, in which a first finger is held in place over one of the one or more user interface elements and in which a second finger is swiped, the second user interaction input indicating a selection of another one of the one or more user interface elements associated with the first object; and
rendering, based on the other user interaction input, a two-dimensional object that includes at least two facets, of the plurality of facets of the first three-dimensional object, arranged in two dimensions.

2. The method of claim 1, further comprising:
selecting the arrangement, the representation of the first three-dimensional object, the one or more user interface elements, or a combination thereof from a template, a preconfigured set, or a combination thereof.

3. The method of claim 2, wherein the arrangement, the representation of the first three-dimensional object, the one or more user interface elements, or a combination thereof selected from the template, the preconfigured set, or the combination thereof is downloadable from a content provider.

4. The method of claim 1, further comprising:
receiving a third user interaction input that indicates a selection of another one of the one or more user interface elements associated with the first object; and
rendering a third three-dimensional object based on the third selection of the other user interface element.

5. The method of claim 1,
wherein the manipulation of the representation of the first three-dimensional object within the virtual three-dimensional space is further based on the first user interaction input.

6. The method of claim 1, further comprising:
presenting an audio feedback, a tactile feedback, or a combination thereof based on the first user interaction input.

7. The method of claim 1, wherein the manipulation of the representation of the first three-dimensional object includes a rotation of the representation of the first three-dimensional object.

8. A user device comprising:
a non-transitory computer-readable memory device storing processor-executable instructions; and
one or more processors configured to execute the processor-executable instructions, wherein executing the processor-executable instructions causes the one or more processors to:
  determine an arrangement of one or more user interface elements based on user profile information, content information, contextual information, or a combination thereof;
  render a representation of a first three-dimensional object in a user interface of the user device,
    wherein the representation includes one or more surface segments situated on a plurality of surfaces of the first-three dimensional object,
    wherein the first three-dimensional object is a particular three-dimensional shape;
  associate the one or more user interface elements respectively with the one or more surface segments based on the arrangement;
  determine that the user device has been rotated;
  manipulate, based on the rotation of the user device, the representation of the first three-dimensional object within a virtual three-dimensional space to expose the one or more user interface elements associated with the one or more surface segments that are visible in the user interface, wherein a direction of the manipulation is based on a direction of the rotation of the user device;
  receive a first user interaction input that indicates a selection of the user interface element; and
  render, based on the first user interaction input, a representation of a second three-dimensional object to present one or more additional user interface elements, that are associated with the selected user interface element,
    wherein the second three-dimensional object is a same three-dimensional shape as the particular three-dimensional shape of the first three-dimensional object;
  receive a second user interaction input, in which a first finger is held in place over one of the one or more user interface elements and in which a second finger is swiped, the second user interaction input indicating a selection of another one of the one or more user interface elements associated with the first object; and
  render, based on the second user interaction input, a two-dimensional object that includes at least two surfaces, of the plurality of surfaces of the first three-dimensional object, arranged in two dimensions.

9. The user device of claim 8, wherein executing the processor-executable instructions further causes the one or more processors to:
select the arrangement, the representation of the first three-dimensional object, the one or more user interface elements, or a combination thereof from a template, a preconfigured set, or a combination thereof.

10. The user device of claim 9, wherein the arrangement, the representation of the first three-dimensional object, the one or more user interface elements, or a combination selected thereof from the template, the preconfigured set, or the combination thereof is downloadable from a content provider.

11. The user device of claim 8, wherein executing the processor-executable instructions further causes the one or more processors to:
   receive a third user interaction input that indicates a selection of another one of the one or more user interface elements associated with the first object; and
   render a third three-dimensional object based on the third selection of the other user interface element.

12. The user device of claim 8,
   wherein the manipulation of the representation of the first three-dimensional object within the virtual three-dimensional space is further based on the first user interaction input.

13. The user device of claim 1, wherein executing the processor-executable instructions further causes the one or more processors to:
   present an audio feedback, a tactile feedback, or a combination thereof based on the first user interaction input.

14. The user device of claim 8, wherein a manipulation of the representation of the first three-dimensional includes a rotation of the representation of the first three-dimensional object.

15. A non-transitory computer-readable medium storing processor-executable instructions, which, when executed by one or more processors of a user device, cause the one or more processors to:
   render a representation of a first three-dimensional object in a user interface of the user device,
      wherein the representation includes one or more surface segments that are each associated with one user interface element,
      wherein the first three-dimensional object is a particular three-dimensional shape that includes a plurality of facets arranged in three dimensions;
   determine that the user device has been rotated;
   manipulate, based on the rotation of the user device, the representation of the first three-dimensional object within a virtual three-dimensional space to expose the one or more user interface elements associated with the one or more surface segments that are visible in the user interface, wherein a direction of the manipulation is based on a direction of the rotation of the user device;
   receive a first user interaction input that indicates a selection of the user interface element;
   render, based on the first interaction input, a representation of a second three-dimensional object to present one or more additional user interface elements, that are associated with the selected user interface element,
      wherein the second three-dimensional object is a same three-dimensional shape as the particular three-dimensional shape of the first three-dimensional object;
   receive a second user interaction input that indicates a selection of another one of the one or more user interface elements associated with the first object; and
   render, based on the second user interaction input, a two-dimensional object that includes at least two facets, of the plurality of facets of the first three-dimensional object, arranged in two dimensions.

16. The user device of claim 15, wherein the processor-executable instructions further cause the one or more processors to:
   receive a third user interaction input that indicates a selection of another one of the one or more user interface elements; and
   render a third three-dimensional object based on the third selection of the other user interface element.

17. The user device of claim 15, wherein the first user interaction input includes a touch interaction, a gesture interaction, a voice interaction, or a combination thereof,
   wherein the manipulation of the representation of the first three-dimensional object within the virtual three-dimensional space is further based on the touch interaction, the gesture interaction, the voice interaction, or the combination thereof.

* * * * *